United States Patent
Betts et al.

(10) Patent No.: US 7,841,005 B2
(45) Date of Patent: Nov. 23, 2010

(54) METHOD AND APPARATUS FOR PROVIDING SECURITY TO WEB SERVICES

(75) Inventors: Christopher Betts, Mount Dandenong (AU); Tony Rogers, Rowville (AU)

(73) Assignee: Computer Assoicates Think, Inc., Islandia, NY (US)

( * ) Notice: Subject to any disclaimer, the term of this patent is extended or adjusted under 35 U.S.C. 154(b) by 1588 days.

(21) Appl. No.: 11/132,699

(22) Filed: May 19, 2005

(65) Prior Publication Data

US 2005/0268333 A1     Dec. 1, 2005

Related U.S. Application Data

(60) Provisional application No. 60/573,580, filed on May 21, 2004.

(51) Int. Cl.
*G06F 21/02* (2006.01)
*G06F 11/30* (2006.01)
*G06F 15/16* (2006.01)

(52) U.S. Cl. ................ 726/23; 713/176; 709/224

(58) Field of Classification Search ............... None
See application file for complete search history.

(56) References Cited

U.S. PATENT DOCUMENTS

| | | | |
|---|---|---|---|
| 6,269,399 B1 * | 7/2001 | Dyson et al. ............... 709/224 |
| 6,317,837 B1 * | 11/2001 | Kenworthy ................... 726/11 |
| 6,324,648 B1 * | 11/2001 | Grantges, Jr. ................ 726/12 |
| 6,426,955 B1 * | 7/2002 | Gossett Dalton, Jr. et al. .... 370/401 |
| 6,442,588 B1 | 8/2002 | Clark et al. ................. 709/203 |
| 6,510,464 B1 * | 1/2003 | Grantges et al. ............ 709/225 |
| 6,519,703 B1 * | 2/2003 | Joyce ........................... 726/22 |
| 6,557,037 B1 * | 4/2003 | Provino ........................ 709/227 |
| 6,795,443 B1 * | 9/2004 | Jeong et al. ............... 370/395.5 |
| 6,832,321 B1 * | 12/2004 | Barrett ....................... 726/11 |
| 6,845,452 B1 * | 1/2005 | Roddy et al. ................. 726/11 |
| 6,941,474 B2 | 9/2005 | Boies et al. ................... 726/11 |
| 6,996,093 B2 * | 2/2006 | Dalton et al. ............... 370/356 |
| 7,043,753 B2 * | 5/2006 | Roddy et al. ................. 726/11 |
| 7,100,201 B2 * | 8/2006 | Izatt ........................... 726/11 |
| 7,184,538 B1 * | 2/2007 | Doskow et al. ........... 379/221.1 |
| 7,194,554 B1 * | 3/2007 | Short et al. ................. 709/246 |
| 7,218,613 B1 * | 5/2007 | Doskow et al. ............. 370/252 |
| 7,224,686 B1 * | 5/2007 | Doskow et al. ............. 370/352 |
| 7,272,122 B2 * | 9/2007 | Trossen et al. ............. 370/331 |
| 7,290,283 B2 * | 10/2007 | Copeland, III ............... 726/25 |

(Continued)

OTHER PUBLICATIONS

Notification of Transmittal of the International Search Report and the Written Opinion of the International Searching Authority of International application No. PCT/US 2005/017789; filed May 19, 2005 (11 pages), Aug. 24, 2005.

(Continued)

*Primary Examiner*—Christopher A Revak
(74) *Attorney, Agent, or Firm*—Baker Botts L.L.P.

(57) ABSTRACT

Method and firewall architecture system for providing security to web services. A firewall architecture can determine whether data in a web service message is valid and then can determine whether the source of the web service message is authorized to pass through the firewall architecture. If it is determined that the web service message is authorized to pass through the firewall architecture, the web service message is forwarded to its destination.

21 Claims, 4 Drawing Sheets

U.S. PATENT DOCUMENTS

| | | | |
|---|---|---|---|
| 7,360,090 B1 * | 4/2008 | Doskow et al. | 713/170 |
| 7,525,956 B2 * | 4/2009 | Dalton et al. | 370/352 |
| 2002/0010784 A1 * | 1/2002 | Clayton et al. | 709/229 |
| 2002/0059425 A1 | 5/2002 | Belfiore et al. | 709/226 |
| 2002/0104017 A1 | 8/2002 | Stefan | 713/201 |
| 2002/0166063 A1 | 11/2002 | Lachman et al. | 713/200 |
| 2003/0204719 A1 | 10/2003 | Ben-Itzhak | 713/152 |
| 2004/0088409 A1 | 5/2004 | Braemer et al. | 709/225 |
| 2005/0228984 A1 * | 10/2005 | Edery et al. | 713/153 |
| 2006/0155865 A1 * | 7/2006 | Brandt et al. | 709/230 |
| 2008/0072307 A1 * | 3/2008 | Maes | 726/12 |

OTHER PUBLICATIONS

Christopher Betts; U.S. Appl. No. 11/132,632; "Method and Apparatus for Processing Web Service Messages;" 32 pages, May 19, 2005.

Advisory Action Before the Filing of an Appeal Brief for U.S. Appl. No. 11/132,632; inventor: Christopher Betts; 3 pages, May 5, 2009.

Office Action Summary for U.S. Appl. No. 11/132,632; inventor: Christopher Betts; 29 pages, Feb. 19, 2009.

Office Action Summary for U.S. Appl. No. 11/132,632; inventor: Christopher Betts; 16 pages, Sep. 5, 2008.

* cited by examiner

METHOD AND APPARATUS FOR PROVIDING SECURITY TO WEB SERVICES

CROSS-REFERENCE TO RELATED APPLICATION

This application claims the benefit of U.S. provisional application Ser. No. 60/573,580, filed May 21, 2004 and entitled "METHOD AND APPARATUS FOR PROVIDING SECURITY TO WEB SERVICES".

TECHNICAL FIELD

The present disclosure relates generally to web services and, more particularly, to methods and apparatuses for providing security to web services.

DESCRIPTION OF THE RELATED ART

Computer systems are commonly used by enterprises and other organizations to store and manage information (in many instances, confidential and/or sensitive information). Constituents of the enterprises and organizations often have around-the-clock access to the stored information through the use of websites and related web-based services. Computer systems as referred to herein may include individual computers, servers, computing resources, networks, etc.

While use of such computer systems has many advantages, enterprises and other organization which use the systems and networks are exposed to risks caused by malicious attacks and/or malicious programs which exploit or vandalize the systems and networks. Malicious attacks (for example, denial of service attacks, buffer overflow attacks, etc.) are attempts by individuals to willfully and/or maliciously exploit computer systems and can potentially compromise sensitive data, damage software and/or hardware, tie up valuable network resources and disrupt the availability of websites and related web-based services. Malicious programs (for example, computer viruses, Trojan horses, worms, etc.) have the ability to damage expensive computer hardware, destroy valuable data, tie up limited computing resources and/or compromise security of sensitive information.

Firewalls are a tool commonly employed by enterprises and other organizations to protect computer systems against the threat of malicious attacks and malicious programs. A firewall is typically a separate computer system and/or software system which includes a set of related programs that can shield a private computer system from a public network (for example, the Internet). A firewall provides security protection to the system by screening incoming requests and preventing unauthorized access. The actual means by which firewalls protect computer systems can vary widely from firewall to firewall, but in principle, firewalls may inspect data traffic between the system and the network and can block the traffic or permit the traffic. Some firewalls place a greater emphasis on blocking traffic, while others emphasize permitting traffic. Firewalls generally block or permit traffic in accordance with an access control policy. For example, an access control policy typically permits normal web traffic but blocks denial of service attacks. Access control policies may be pre-defined, modified, or fully customized to meet the needs of the network being protected.

Figure 1A:
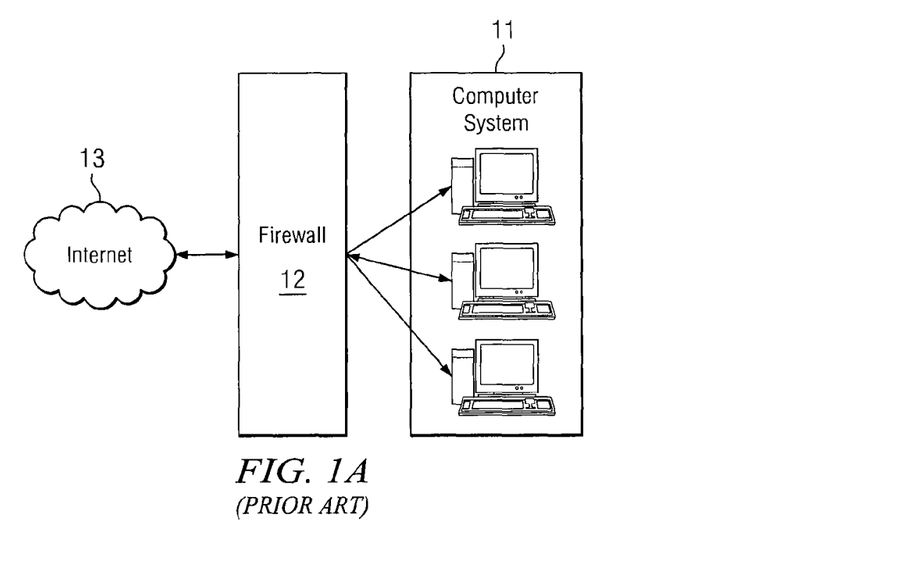
FIG. 1A shows an exemplary computer system protected by a firewall.

FIG. 1A illustrates a computer system 11 that is shielded from the Internet B by a firewall 12. The firewall 12 may be a dedicated gateway server or it may be software run on any server. Firewall 12 may have a single connection to the computer system 11 that can be inspected for undesirable traffic. Undesirable traffic can be blocked before reaching the protected computer system 11. Firewall 12 may also have a connection to a second computer system, for example, the Internet 13 for which computer system 11 is being protected against.

Web services are automated resources that can be accessed over, for example, a wide area network (WAN), the Internet, etc. Web services typically are designed to perform a specific function and can be accessible to a wide group of prospective users which may include human users as well as other software systems. Web services generally are identified by Universal Resource Identifiers (URIs), analogous to identification of websites by Uniform Resource Locators (URLs). Web services typically communicate using Extensible Markup Language (XML) and Unicode.

However, the use of web services may pose a new security risk because they generally utilize the same communications ports and protocols as normal web traffic. Web service traffic can look like normal web traffic to a firewall. As a result, web services are frequently interpreted as "safe" web browser traffic and almost invisible to firewalls.

Some web services firewalls simply check XML data produced by web services. For example, the firewalls may check for "well formed" XML, decrypt/encrypt XML when called upon to do so, authenticate and authorize via built-in proprietary management systems, create audit logs, detect denial of service attacks, scan for viruses, etc. However, these firewalls inefficiently utilize computer system resources by performing or repeating the same or a part of a task a number of times. Data is repetitiously manipulated a number of times prior or during the execution of the tasks. Furthermore, integration of the firewall with existing security systems and support for existing web services protocols and/or other security protocols are not particularly effective.

While web service providers generally wish to make their web services more widely available, they also wish to maintain control of their technology, monitor and secure the services, while being responsive to users of the web services. There is a need for reliable and effective ways to secure and manage web services and process web services traffic.

SUMMARY

This application describes methods and apparatuses for providing security to web services.

An apparatus for providing security to web services, according to an embodiment of the present disclosure, includes a data screening layer for determining whether data in a web service message is valid, a security screening layer for determining whether a source of the web service message is authorized to pass through a firewall architecture, and a gatekeeper for allowing the web service message to pass through the firewall architecture, if the security screening layer determines that the source of the web service message is authorized to pass through the firewall architecture.

A method for providing security to web services, according to an embodiment of the present disclosure, includes determining whether data in a web service message is valid, determining whether a source of the web service message is authorized to pass through a firewall architecture, and allowing the web service message to pass through the firewall architecture if it is determined that the web service message is authorized to pass through the firewall architecture.

The methods and apparatuses of this disclosure may be embodied in one or more computer programs stored on a computer readable medium or program storage device and/or transmitted via a computer network or other transmission medium. For example, a computer storage medium including computer executable code for providing security to web services, according to an embodiment of the present disclosure, includes code for determining whether data in a web service message is valid, code for determining whether a source of the web service message is authorized to pass through a firewall architecture, and code for allowing the web service message to pass through the firewall architecture if it is determined that the web service message is authorized to pass through the firewall architecture.

BRIEF DESCRIPTION OF THE DRAWINGS

The features of the present application can be more readily understood from the following detailed description with reference to the accompanying drawings wherein.

DETAILED DESCRIPTION

The present disclosure provides tools (in the form of methodologies, apparatuses, and systems) for providing security to web services.

The following exemplary embodiments are set forth to aid in an understanding of the subject matter of this disclosure, but are not intended, and should not be construed, to limit in any way the claims which follow thereafter. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

Figure 1B:
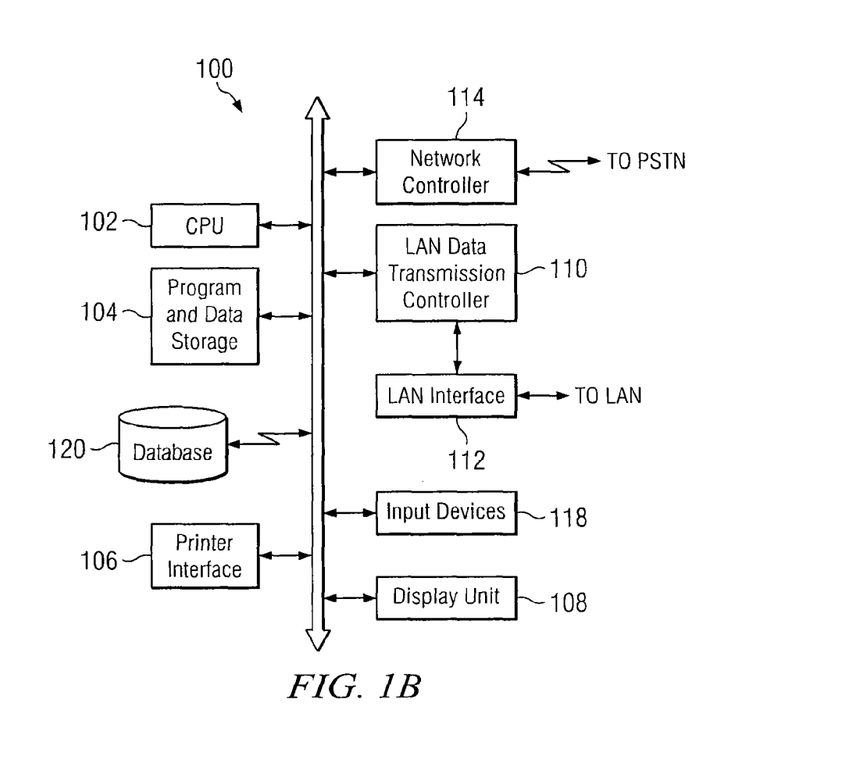
FIG. 1B shows a block diagram of an exemplary computer system capable of implementing the methods and apparatuses of the present disclosure.

FIG. 1B shows an example of a computer system 100 which may implement the methods and apparatuses of the present disclosure. The apparatuses and methods of the present disclosure may be implemented in the form of a software application running on a computer system, for example, a mainframe, personal computer (PC), handheld computer, server, etc. The software application may be stored on a recording media locally accessible by the computer system, for example, floppy disk, optical disc; hard disk, etc., or may be remote from the computer system and accessible via a hard wired or wireless connection to a computer network, (for example, a local area network, the Internet, etc.) or another transmission medium.

The computer system 100 can include a central processing unit (CPU) 102, program and data storage devices 104, a printer interface 106, a display unit 108, a (LAN) local area network data transmission controller 110, a LAN interface 112, a network controller 114, an internal bus 116, and one or more input devices 118 (for example, a keyboard, mouse etc.). As shown, the system 100 may be connected to a database 120, via a link 122.

Figure 2A:
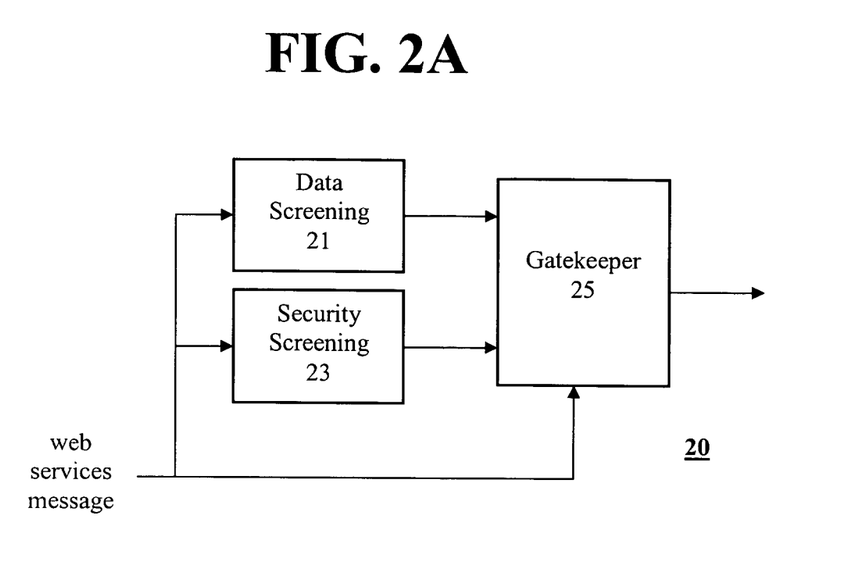
FIG. 2A shows a block diagram illustrating an apparatus for providing security to web services, according to an embodiment of the present disclosure.

An apparatus 20 for providing security to web services, according to one embodiment of this disclosure, will be discussed below with reference to FIG. 2A. The apparatus includes a data screening layer 21, a security screening layer 23 and gatekeeper 25.

Figure 2B:
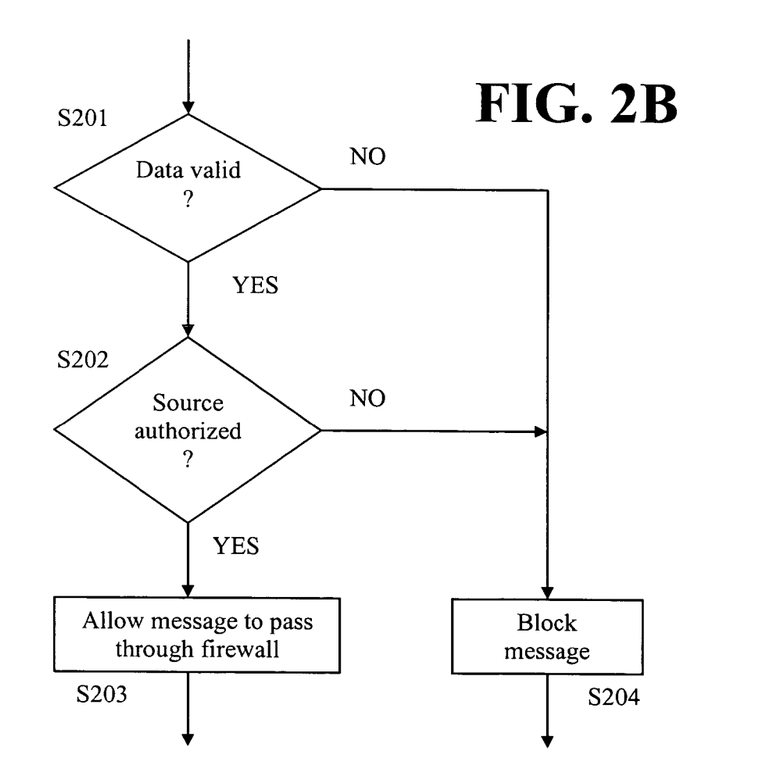
FIG. 2B shows a flow chart illustrating a method for providing security to web services, in the embodiment of FIG. 2A.

A method for providing security to web services will be explained below with reference to FIGS. 2A and 2B. The data screening layer 21 determines whether data in a web service message is valid (step S201). The security screening layer 23 determines whether a source of the web service message is authorized to pass through a firewall (step S202). The gatekeeper 25 allows the web service message to pass through the firewall (step S203), if the security screening layer 23 determined that the source of the web service message is authorized to pass through the firewall (step S202, YES). If the data in the web service message is not valid (step S201, No) or if the source of the message is not authorized to pass through the firewall (step S202, No), the gatekeeper 25 blocks the message from being passed (step S204).

The data screening layer may include means for scanning ports and detecting denial of service attacks, means for checking for correctly formatted SOAP packets and valid XML, means for translating and verifying a destination address of the web service message, means for placing the web service message in a canonicalized form, and means for translating and verifying the data of the web service message. The data of the web service message can be verified against limits set in a WSDL file. The destination address can be checked by using a Universal Description, Discovery and Integration server. Means for creating an audit log containing the results obtained from the data screening layer may optionally be provided.

The security screening layer may comprise means for checking a signature of the web service message, means for identifying a source of the web service message, and means for determining whether access to a particular resource is restricted. Means for creating an audit log containing the results obtained from the security screening layer may optionally be provided.

The apparatus 20 may further comprise means for providing real time monitoring information, and/or an interface layer enabling the web service message to be further processed.

The apparatus 20 can be integrated in a firewall to provide added security features, for example, offering protection to computer systems which may host web services. The added security features may be layered on top of a firewall. By layering levels of protection, efficient use of computer resources can be achieved because a web service message can be intercepted once and then inspected by each feature layer until a layer identifies the web service message as undesirable. Web service messages identified as undesirable can be blocked and need not be inspected by subsequent feature layers.

Figure 3:
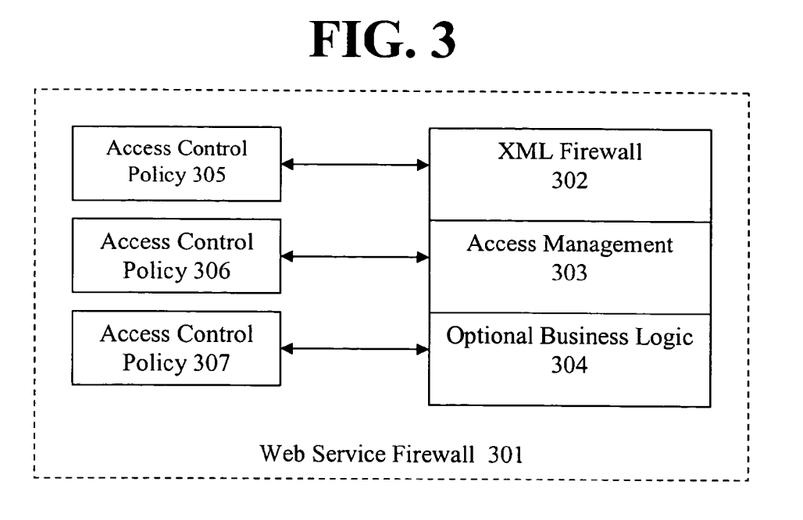
FIG. 3 shows a block diagram illustrating a web service firewall architecture, according to an embodiment of the present disclosure.

According to another embodiment of the present disclosure, the firewall can have an architecture consisting of three layers, such as, for example, an XML firewall layer, an Access Management layer, and a Business Logic layer. FIG. 3 is a block diagram illustrating a web service firewall architecture, according to an embodiment of the present disclosure. The web service firewall 301 can be made up of two or more distinct functional layers. An XML firewall 302 can make up the first layer and an Access Manager 303 can make up the second layer. Optional business logic 304 may make up the third layer. Web service messages can be intercepted by the web service firewall 301 and can be inspected by each layer of the web service firewall 301. For example, the intercepted web service message may first be inspected by the XML firewall 302 layer, then by the access management 303 layer, and finally by one or more business logic 304 layers. Each layer can inspect the web service message for conformity with an access control policy 305-307 associated with that layer. When a web service message is deemed in accordance with the associated access control policy 305-307, that web service message may be inspected by the next layer. When a web service message is deemed to be in violation of the associated access control policy, that web service message is deemed undesirable. Undesirable web service messages are not inspected by subsequent layers and are prevented (blocked) from reaching the protected computer system.

The firewall architecture of the present disclosure can be implemented either as a gateway server, or as a central policy server with distributed enforcement points on clients and servers, or both, etc. It can enforce flexible security policies on arbitrary web service messages and provide security for complex systems of web services.

Figure 4:
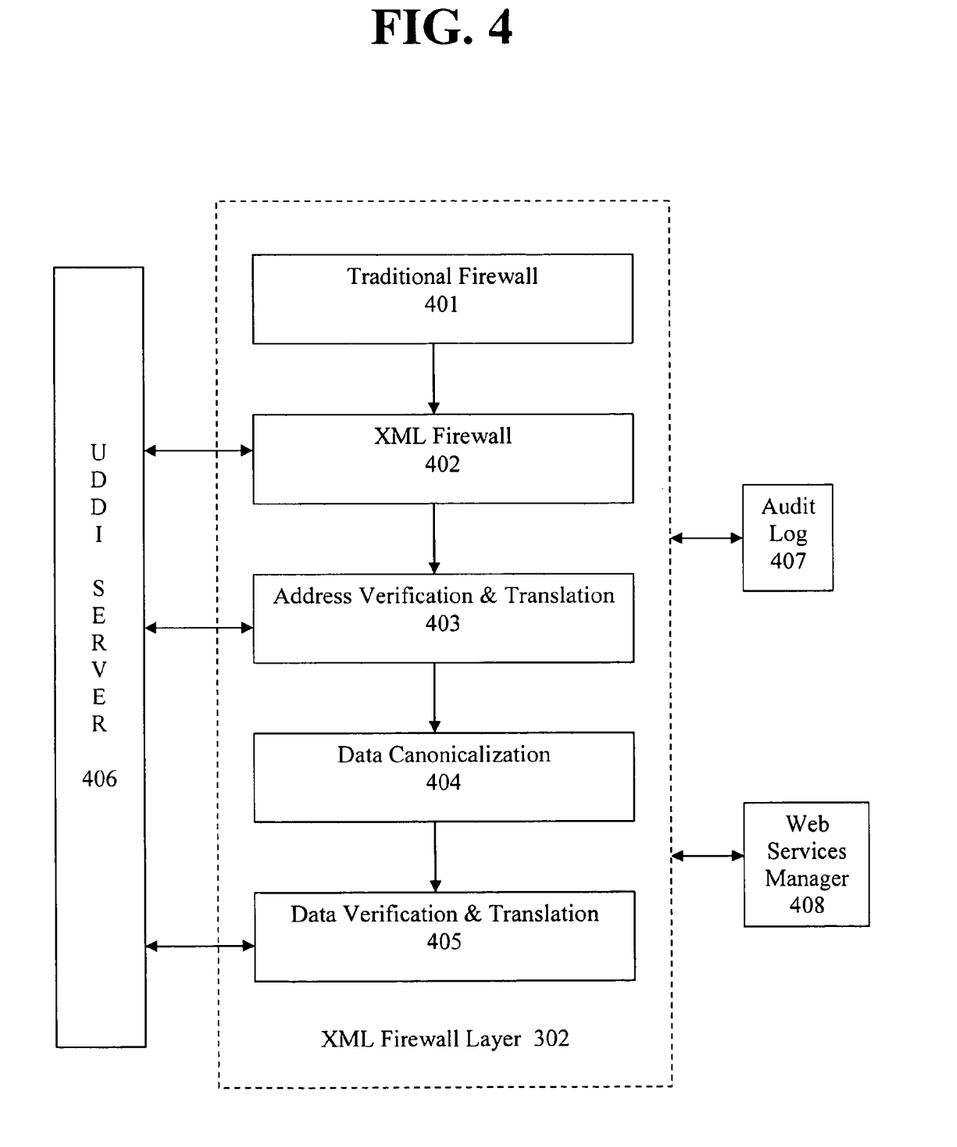
FIG. 4 shows a schematic diagram illustrating the XML firewall layer, according to an embodiment of the present disclosure.

The XML Firewall 302 layer can perform a data screening function by parsing and processing the XML of the web service message. FIG. 4 is a schematic diagram illustrating the XML firewall layer, according to an embodiment of the present disclosure. A traditional firewall 401 can perform the normal housekeeping tasks of a firewall, such as, monitoring ports, detecting port scans, detecting gross denial of service attacks, etc. An XML firewall 402 can check for correctly formatted Simple Open Access Protocol (SOAP) packets and valid XML. An Address Verification and Translation 403 layer can check and translate the destination address of web service messages.

A quick lookup can be performed using the Universal Description, Discovery and Integration (UDDI) Server 406 to determine whether the requested web service exists. If the web service does not exist, the request can be immediately rejected. In addition, incoming messages can be translated using queries against the UDDI server 406.

A Data Canonicalization 404 layer can place all messages in a standard, or canonical form in order to avoid attacks against Unicode or XML documents. However, data canonicalization may have implications for digital signatures (or at least, those not implemented in XML-aware form). According to another embodiment of the present invention, all input data can be in a canonical form and web service messages that are not in this form can be rejected. According to another embodiment, the digital signature can be validated prior to canonicalization.

A Data Verification and Translation 405 layer can verify the data against any limits that can be set in a Web Services Description Language (WSDL) file. The WSDL file can describe all of the information for accessing a web service. The data can be verified against any limits set in the WSDL file and invalid data can be rejected. This can be useful for guarding against attacks such as buffer overflow attacks, etc. After checking the data, mappings between different WSDL formats using XML style sheet transformations (XSLT) can be defined. The XSLT files can be stored in a UDDI repository and can be accessed at the same time that the address translation step is performed.

According to an embodiment of the present disclosure, an audit log 407 can be created to keep track of security information. For example, signature verification details, timestamps, etc. can be published to the audit log 407.

A web services manager 408 can provide real time monitoring information describing the current status of a component (for example, running, not running, waiting, etc.), load information (for example, running at 60% of capacity), etc.

Figure 5:
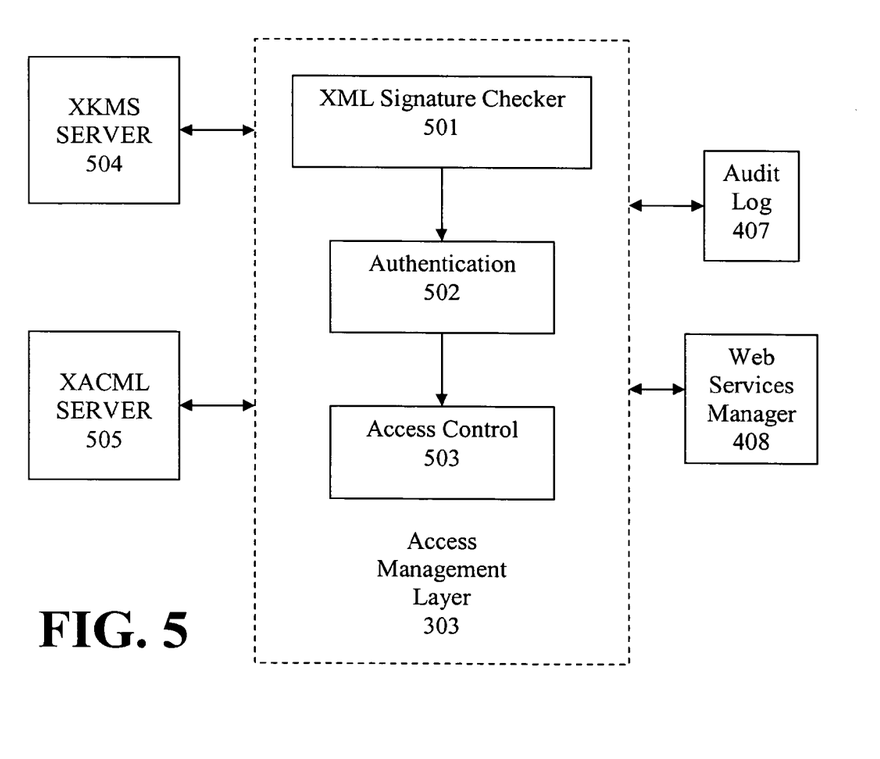
FIG. 5 shows a schematic diagram illustrating the Access Management 303 layer, according to an embodiment of the present disclosure.

The Access Management 303 layer can perform a security and access control function by determining whether an otherwise valid message can proceed. FIG. 5 is a schematic diagram illustrating the Access Management 303 layer, according to an embodiment of the present disclosure. An XML Signature Checker 501 can authenticate the user of a SOAP message to guarantee message integrity. Messages that are not signed by a trusted certificate can be rejected.

An Authentication 502 layer can identify the source of the message formally by using a variety of methods, for example, Security Assertion Markup Language (SAML), a HyperText Transfer Protocol (HTTP) username/password, Kerberos, Liberty Alliance authorization, etc. The certificates used by the XML Signature Checker 501 can be used by the Authentication 502 layer. Pluggable authentication modules can be used in conjunction with the Authentication 502 layer. Such modules can cover using various authentication methods to authenticate the source of the messages, such as, for example, SAML, Service Provisioning Markup Language (SPML), Lightweight Directory Access Protocol (LDAP), Liberty Alliance, WS-Security specifications, etc. According to an embodiment of the present disclosure, the Authentication 502 layer can append identity information, translating it into a form that a called web service can use.

An Access Control 503 layer can use the identity of the source of the message obtained in the Authorization 502 layer and determine whether access to a particular resource is allowed. A request can be made to an Extensible Access Control Markup Language (XACML) access control policy server 505. XACML is a standard that can be used for defining an access policy.

According to an embodiment of the present disclosure, an audit log 407 can be created to keep track of security information. For example, access information, signature verification details, timestamps, etc. can be published to the audit log 407.

According to an embodiment of the present disclosure, a web services manager 408 can support Web Services Distributed Management (WSDM) for control and monitoring, and logging authentication information to the audit log. This can allow general integration with generic WSDM supporting management products to provide secure remote management and real time monitoring of the firewall. For example, each and any step may provide real time monitoring information describing the current status of the component (for example, running, not running, waiting, etc.), load information (for example, running at 60% capacity), etc.

The Business Logic 304 layer can enable an interface with a variety of "external" products to add further restrictions and/or modifications to the web service message. According to an embodiment of the present disclosure, this layer can be optional and can allow business to define particular business requirements that may not be easily expressible in XACML. For example, this may involve recording customer reward points, enforcing spending limits, rewarding purchasers who spend over a certain quantity, providing a single source of sales information, etc.

According to another embodiment of the present disclosure, each layer can be part of a separate product.

The specific embodiments described herein are illustrative, and many additional modifications and variations can be introduced on these embodiments without departing from the spirit of the disclosure or from the scope of the appended claims. Elements and/or features of different illustrative embodiments may be combined with each other and/or substituted for each other within the scope of this disclosure and appended claims.

Additional variations may be apparent to one of ordinary skill in the art from reading U.S. provisional application Ser. No. 60/573,580, filed May 21, 2004 and entitled "METHOD AND APPARATUS FOR PROVIDING SECURITY TO WEB SERVICES", the entire contents of which are incorporated herein by reference.

What is claimed is:

1. An apparatus for providing security to web services, comprising:
    a data screening layer, implemented using a computer system, for determining whether data in a web service message is valid, wherein the data screening layer is operable to scan ports and detect denial of service attacks, wherein the data screening layer is further operable to place the web service message in a canonicalized form;
    a security screening layer for determining whether a source of the web service message is authorized to pass through a firewall architecture; and
    a gatekeeper for allowing the web service message to pass through the firewall architecture, if the security screening layer determines that the source of the web service message is authorized to pass through the firewall architecture.

2. The apparatus of claim 1, wherein the data screening layer comprises:
    means for checking for correctly formatted SOAP packets and valid XML;
    means for translating and verifying a destination address of the web service message; and
    means for translating and verifying the data of the web service message.

3. The apparatus of claim 1, further comprising means for creating an audit log containing the results obtained from the data screening layer.

4. The apparatus of claim 2, wherein the destination address is checked by using a Universal Description, Discovery and Integration server.

5. The apparatus of claim 1, wherein the data of the web service message is verified against limits set in a WSDL file.

6. The apparatus of claim 1, wherein the security screening layer comprises:
    means for checking a signature of the web service message;
    means for identifying a source of the web service message; and
    means for determining whether access to a particular resource is restricted.

7. The apparatus of claim 1, further comprising means for creating an audit log containing the results obtained from the security screening layer.

8. The apparatus of claim 1, further comprising means for providing real time monitoring information.

9. The apparatus of claim 1, further comprising an interface layer enabling the web service message to be further processed.

10. A firewall system including the apparatus of claim 1.

11. A method for providing security to web services, comprising:
    determining, using a computer, whether data in a web service message is valid;
    scanning ports and detecting denial of service attacks;
    placing the web service message in a canonicalized form;
    determining, using a computer, whether a source of the web service message is authorized to pass through a firewall architecture; and
    allowing the web service message to pass through the firewall architecture if it is determined that the web service message is authorized to pass through the firewall architecture.

12. The method of claim 11, further comprising:
    (a) checking for correctly formatted SOAP packets and valid XML;
    (b) translating and verifying a destination address of the web service message; and
    (c) translating and verifying the data of the web service message.

13. The method of claim 11, wherein the data of the web service message is verified against limits set in a WSDL file.

14. The method of claim 12, wherein the destination address is checked by using a Universal Description, Discovery and Integration server.

15. The method of claim 12, further comprising creating an audit log containing the results obtained from (a) through (c).

16. The method of claim 11, further comprising:
    (i) checking a signature of the web service message;
    (ii) identifying a source of the web service message; and
    (iii) determining whether access to a particular resource is restricted.

17. The method of claim 16, further comprising creating an audit log containing the results obtained from (i) through (iii).

18. The method of claim 11, further comprising providing real time monitoring information.

19. The method of claim 11, further comprising providing an interface layer enabling the web service message to be further processed.

20. A computer system comprising:
    a processor; and
    a program storage device readable by the computer system, tangibly embodying a program of instructions executable by the processor to perform the method claimed in claim 11.

21. A program storage device readable by a machine, tangibly embodying a program of instructions executable by the machine to perform the method claimed in one of claim 11.

* * * * *

UNITED STATES PATENT AND TRADEMARK OFFICE
CERTIFICATE OF CORRECTION

PATENT NO. : 7,841,005 B2  
APPLICATION NO. : 11/132699  
DATED : November 23, 2010  
INVENTOR(S) : Christopher Betts et al.

Page 1 of 1

It is certified that error appears in the above-identified patent and that said Letters Patent is hereby corrected as shown below:

On the Title page, at Item (73) Assignee should be Computer Associates Think, Inc.

Signed and Sealed this
Nineteenth Day of April, 2011

David J. Kappos
*Director of the United States Patent and Trademark Office*